(12) United States Patent
Ylönen et al.

(10) Patent No.: US 8,566,920 B2
(45) Date of Patent: Oct. 22, 2013

(54) APPLICATION GATEWAY SYSTEM AND METHOD FOR MAINTAINING SECURITY IN A PACKET-SWITCHED INFORMATION NETWORK

(75) Inventors: Tatu Ylönen, Espoo (FI); Tero Kivinen, Espoo (FI); Markus Levlin, Helsinki (FI)

(73) Assignee: Inside Secure, Aix-en Provence (FR)

( * ) Notice: Subject to any disclaimer, the term of this patent is extended or adjusted under 35 U.S.C. 154(b) by 0 days.

(21) Appl. No.: 12/586,965

(22) Filed: Sep. 30, 2009

(65) Prior Publication Data

US 2010/0024026 A1 Jan. 28, 2010

Related U.S. Application Data

(63) Continuation of application No. 10/020,299, filed on Dec. 7, 2001, now abandoned.

(51) Int. Cl.
*H04L 29/06* (2006.01)

(52) U.S. Cl.
USPC .......................................................... 726/13

(58) Field of Classification Search
USPC ................................................... 726/11–14
See application file for complete search history.

(56) References Cited

U.S. PATENT DOCUMENTS

| | | |
|---|---|---|
| 5,623,601 A | 4/1997 | Vu |
| 5,950,195 A | 9/1999 | Stockwell et al. |
| 6,098,172 A * | 8/2000 | Coss et al. .................. 726/11 |

(Continued)

FOREIGN PATENT DOCUMENTS

EP 1119151 7/2001

OTHER PUBLICATIONS

Cheng et al., WTCP: an Efficient Transmission Control Protocol for Wired/Wireless Internetworking, obtained from http://nr.stic.gov.tw/ejournal/ProceedingA/v24n3/176-185, Nov. 1999, pp. 176-185.
Leech et al., "RFC 1928—SOCKS Protocol Version 5", Mar. 1996, pp. 1-10, obtained from http://www.faqs.org/rfcs/rfc1928.html.

(Continued)

*Primary Examiner* — Jeffrey D Popham
(74) *Attorney, Agent, or Firm* — Allen, Dyer, Doppelt, Milbrath & Gilchrist, P.A.

(57) ABSTRACT

A method and apparatuses are disclosed for handling digital data packets at a logical borderline that separates an untrusted packet-switched information network from a protected domain. A packet processor part intercepts a packet that is in transit between the untrusted packet-switched information network and the protected domain. The packet is examined at the packet processor part in order to determine, whether the packet contains digital data that pertains to a certain protocol. If the packet is not found to contain such digital data, it is processed at the packet processor part. If the packet is found to contain digital data that pertains to said certain protocol, it gets redirected to an application gateway part that processes the packet according to a set of processing rules based on obedience to said certain protocol. The packet processor part is a kernel mode process running in a computer device and the application gateway part is a user mode process running in a computer device.

22 Claims, 9 Drawing Sheets

(56) References Cited

U.S. PATENT DOCUMENTS

| | | | |
|---|---|---|---|
| 6,131,163 A | 10/2000 | Wiegel | |
| 6,182,226 B1 | 1/2001 | Reid et al. | |
| 6,212,558 B1 | 4/2001 | Antur et al. | |
| 6,321,336 B1 * | 11/2001 | Applegate et al. | 726/11 |
| 6,687,732 B1 * | 2/2004 | Bector et al. | 709/200 |
| 6,754,709 B1 | 6/2004 | Gbadegesin | |
| 6,925,572 B1 * | 8/2005 | Amit et al. | 726/15 |
| 2002/0124090 A1 | 9/2002 | Poier et al. | |

OTHER PUBLICATIONS

Ross et al., "3.3 Connectionless Transport: UDP", 2000, pp. 1-6, obtained from http://www-net.cs.umass.edu/kurose/transport/UDP.html.

"The TCP Datagram, I wanted to know and now you can too (part 2)", obtained from http://web.archive.org/web/20010408184021/http://www.daemon.org/tcp.html, Apr. 2001, pp. 1-3.

* cited by examiner

APPLICATION GATEWAY SYSTEM AND METHOD FOR MAINTAINING SECURITY IN A PACKET-SWITCHED INFORMATION NETWORK

CROSS-REFERENCE TO RELATED APPLICATION

This application is a continuation of U.S. patent application Ser. No. 10/020,299, filed Dec. 7, 2601, which is incorporated herein by reference in its entirety.

TECHNICAL FIELD

The invention concerns generally the technology of controlling the transmission of digital information packets between an insecure information network and a protected domain. Especially the invention concerns the technology of combining the so-called application gateway functionality to a firewall that controls the transmission of TCP/IP-packets (Transmission Control Protocol/Internet Protocol).

BACKGROUND OF THE INVENTION

The conventional way of protecting a protected domain against hostile attacks from an insecure external information network is to route all data packets transmitted therebetween through a so-called firewall. At the priority date of this patent application the term "data packets" refers in this regard practically invariably to TCP/IP-packets. The protected domain is almost invariably a private corporate network, but firewall applications exist also for protecting individual computers as well as small home networks.

A conventional firewall performs packet-level filtering based on packet headers. This means that the firewall examines the TCP/IP header of each packet routed to it, and either rejects or passes the packet depending on a set of filtering rules defined by a supervisory user who is responsible for network security. As a very conventional example the supervisory user may impose a strict screening policy according to which only those incoming packets that according to their header originate from a previously known and trusted external host are passed through to the protected domain. A firewall can apply different filtering rules to incoming and outgoing packets, and even different filtering rules depending on which user (i.e. which IP address) of the protected domain is involved in the communication.

More versatility can be added to the basic firewall functionality by instructing the firewall to look at not only the TCP/IP header but also certain other header information within each packet. In packet-switched information networks TCP/IP packets are only used as the vehicle for transferring any kind of data. As an illustrative example one may consider IP as the way of defining a communications network between a multitude of independently addressable endpoints, and TCP as the way of setting up, maintaining and tearing down temporary communication connections within said communications network. Completely different protocols may then define the form and content of the data that is encapsulated as payload into TCP/IP packets for transmission. A versatile firewall may comprise e.g. a filtering rule according to which TCP/IP packets from a certain external source are only passed if they are related to an http (hypertext transfer protocol) connection but rejected otherwise. In order to implement such a rule the firewall looks closely enough at each packet to see, whether an http header follows the TCP/IP header in the packet.

Also the concept of stateful inspection has been introduced in connection with firewalls. At the priority date of this patent application the exact meaning of stateful inspection is not well established, but most often it is taken to mean some kind of time and connection dependent firewall functionality. This means that a filtering rule at the firewall is valid e.g. only for the duration of a certain TCP/IP connection; in other words the firewall functionality is tied to the state of each connection. The purpose of such stateful inspection is to "close the doors" after a trusted and accepted connection has come to an end, so that nobody can later deceptively utilize the same source address by pretending to be the trusted user residing at that address.

The common and most serious drawback of all packet filtering firewall solutions known at the priority date of this patent application is that no attention is actually paid to whether the payload data in the TCP/IP packets is what it pretends to be. At most a firewall recognizes that the stream of packets that belongs to a certain active TCP/IP connection appears to carry something defined by protocol X, which we can here denote as the third protocol (taken that the TCP and IP are the first and second protocols respectively). The firewall may check for indications about a certain third protocol being in use, and use such basic indications in making a filtering decision, but it is not capable of monitoring, whether there is anything suspicious in the way in which the third protocol is being used. For example various video protocols exist that involve procedures complicated enough for the firewall to be essentially incapable of monitoring, whether the exchanging of packets is proceeding as is should.

The known solution to the above-mentioned drawback is to replace a simple firewall with a more versatile monitoring and controlling arrangement known as an application gateway or just AG for short. An application gateway differs from a firewall in that the latter is just a packet-level filter that only performs filtering packet by packet on the basis of (TCP/IP) header information, while the former comprises complete knowledge about how a certain third protocol should work so that it can monitor, whether a certain connection proceeds according to said certain third protocol. One of the simplest imaginable application gateway approaches is to check, whether all packets that carry the header of a certain third protocol actually conform to the regulations concerning packet composition under said third protocol. More elaborate application gateway arrangements may e.g. monitor, whether a sequence of handshake messages exchanged under said third protocol conforms to the appropriate regulations concerning handshakes.

For example application gateways specific to the SMTP (Simple Mail Transfer Protocol) are known. These are security-enhancing devices that are coupled between the Internet and an e-mail server that runs the e-mail functionality of a corporate network. The task of an SMTP-specific application gateway is to monitor all TCP/IP connections that carry SMTP-related traffic, i.e. e-mails to and from the corporate network. The application gateway ensures that these connections only proceed according to the SMTP specifications.

The difference between a firewall and an application gateway has been illustrated so that while a firewall is merely a properly instructed mail sorter who reads the addresses of sender and recipient on each envelope and either forwards or shreds the sealed envelopes accordingly, an application gateway is the corporate lawyer who opens the envelope, reads the letter contained therein and evaluates its true meaning before either passing the letter on to its original intended recipient or taking some other appropriate action.

An application gateway is definitely an advancement beyond firewalls that only perform packet-level filtering. However, it represents a step backwards in throughput, complexity and susceptibility to software crash. Implementing application gateway functionality requires considerable computational effort, which inevitably increases the expected delay in letting through also packets that are completely legal and valid. Application gateways may require considerably more memory than firewalls, because monitoring the proceeding and state of connections requires the accumulation of connection history data concerning each monitored communication. It is sad but true that whenever one increases the amount of program code that is used to perform a certain task, an increase is also to be observed in the probability that the code simply contains an error or otherwise does something unexpected under some specific operational conditions.

The publication U.S. Pat. No. 5,623,601 (Vu) describes the basic concept of an application gateway. The "gateway station" of Vu contains application level proxies that perform data screening in order to reject potentially dangerous packets. All IP packets, ICMP (Internet Control Message Protocol) messages and source routing packets are intercepted. The publication mentions as a specific advantage that none of them are forwarded between the external, potentially hostile network and the private network; direct communication therebetween is effectively disabled. While providing a very good basic level of security, this approach has all the above-mentioned drawbacks that relate to limited throughput, high complexity and susceptibility to software crash due to the sheer amount of program code involved.

The publication U.S. Pat. No. 5,950,195 (Stockwell et al.) describes actually an application gateway arrangement, although it uses the term firewall. The publication specifically states that not only message traffic but also message content is reviewed. Also this solution involves problems regarding slow processing, complexity, and susceptibility to software crash.

The publication U.S. Pat. No. 6,182,226 B1 (Reid et al.) is comparable to those mentioned above in that it suggests implementing significant parts of application gateway functionality within the operating system kernel of the "firewall" computer. The kernel is the part of computer software that should operate as fast and as reliably as possible, which is in direct conflict with the teachings of Reid et al.

The publication U.S. Pat. No. 6,212,558 B1 (Antur et al.) provides a listing of firewall types that is in good accordance with the definitions used in this patent application. The publication suggests that the security functions could be distributed to several computer devices in the network. Remarkable interest is placed upon administrating a multitude of firewalls so that uniformity of security policies is maintained.

SUMMARY OF THE INVENTION

It is an object of the present invention to provide the level of security associated with application gateways while simultaneously enabling low complexity, short delays and high reliability in routine processing of packets. It is another object of the invention to provide an application gateway arrangement that is easy to administrate and update according to need. It is a further object of the invention to provide an application gateway arrangement that minimizes the amount of reconfiguration work needed on the workstations of a protected domain. It is yet another object of the invention to provide an application gateway arrangement that combines universal applicability with possibilities of customizing the application gateway functionality to the needs of specific organizations.

The objects of the invention are achieved by implementing packet-level processing in the operating system kernel of a firewall computer, by setting up at least one protocol-specific application gateway somewhere else than in the operating system kernel of the firewall computer, and by instructing the packet-level processing process to recognize packets associated with the protocol that the protocol-specific application gateway handles and to direct the recognized packets to the application gateway.

The characterizing features of the various methods according to the invention are recited in the characterizing portions of the independent patent claims directed to methods.

The characterizing features of the various systems according to the invention are recited in the characterizing portions of the independent patent claims directed to systems.

The characterizing features of the various devices according to the invention are recited in the characterizing portions of the independent patent claims directed to devices.

The characterizing features of the various software program products according to the invention are recited in the characterizing portions of the independent patent claims directed to software program products.

Various further advantageous embodiments of the invention are presented in the depending patent claims.

The fact that only basically filter-type packet-level processing is performed in the operating system kernel of a firewall computer helps to keep the kernel's complexity low and reliability correspondingly high. Application gateways can be handled as modules external to the basic firewall process, which makes it easy to add, remove, replace or update application gateways according to need. The application gateway(s) can be made completely transparent in terms of network addressing by adhering to a suitable address handling policy, which means that the workstations of the protected domain can remain completely unaware of any application gateway being used. Application gateways may be made to only pay attention to protocol-specific matters, thus making it easy for the manufacturer to reproduce and distribute large numbers of application gateways in a cost-effective way. Simultaneously it is possible to customize the application gateways in any desired way, because the basic approach does not limit the rules that the application gateways are programmed to enforce.

We use the generic terms "packet processing", "packet processor component" and "packet processor part" to denote the process or the part of a process that regarding the invention produces the decisive result about redirecting: packets are examined just enough to find out, whether they should be redirected to an application gateway or not. In known architectures where the decision about redirecting follows from the application of certain packet-level filtering rules, packet processing in this sense is equal to packet-level filtering. However, the invention does not require any specific mechanism to be used for making the decisions about redirecting.

Once a packet processor component has recognized that a certain packet should be redirected to an application gateway, it is simple to achieve the actual redirecting e.g. by changing the values of certain destination address and destination port fields in the packet so that the new values indicate the application gateway as the destination. Conventional packet handling will then take care of routing the packet to the application gateway. Also other mechanisms are available for the redirecting.

The application gateway should in any case receive information about the original destination address and destination port of each packet. Various signalling schemes can be utilized to transfer such information between the packet processor component and the application gateway, if the information is not available any more in the redirected packet itself.

After successful application gateway processing the processed packet should be again directed towards their original destination. This task can be either on the responsibility of the application gateway, or on the responsibility of the packet processor component if the application gateway returns all packets to it after they have been subjected to application gateway processing.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

The exemplary embodiments of the invention presented in this description are not to be interpreted to pose limitations to the applicability of the appended claims. The verb "to comprise" is used as an open limitation that does not exclude the existence of also unrecited features. The features recited in depending claims are mutually freely combinable unless otherwise explicitly stated.

Figure 1:
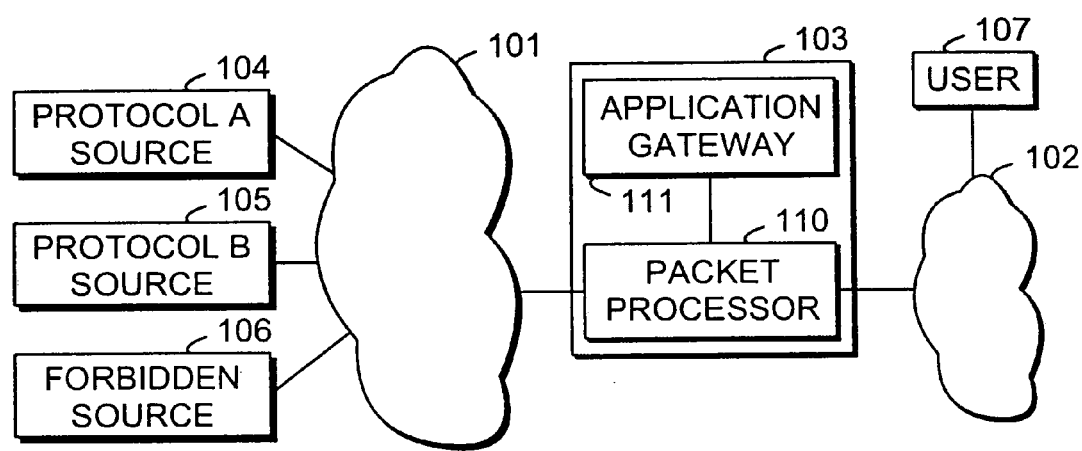
FIG. 1 illustrates a principle of the invention.

FIG. 1 illustrates schematically a situation where an untrusted packet-switched information network 101, typically the Internet, is separated from a private packet-switched information network 102 by a firewall device 103. Coupled to the untrusted packet-switched information network 101 there are various data sources, of which FIG. 1 shows a first source 104 meant for transmitting data that inside the TCP/IP encapsulation conforms to a certain protocol A, a second source 105 that inside the TCP/IP encapsulation conforms to a certain protocol B, and a third source 106 that is forbidden in the sense that no packets from that source should be accepted into the private packet-switched information network 102. An exemplary user 107 of the private packet-switched information network 102 also appears in FIG. 1.

According to the invention the firewall device 103 comprises a packet processor part 110 and an application gateway part 111. FIG. 1 illustrates especially an embodiment of the invention where all connections between the firewall device 103 and the networks 101 and 102 go through the packet processor part 110, and the application gateway part 111 is only at the end of a "blind track" from the packet processor part 110 with no external connections of its own. Later in this description we will discuss other possibilities for arranging the connections of the application gateway part 111. All connections shown in FIG. 1 are bidirectional.

Figure 2A:
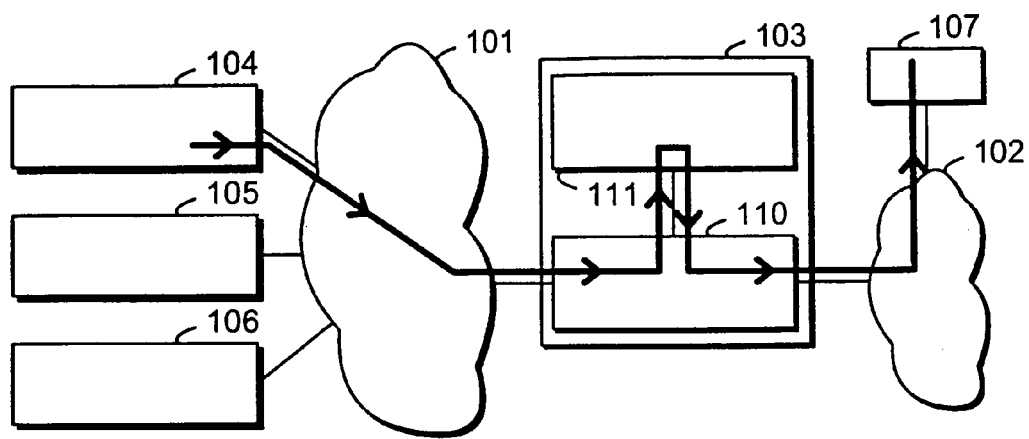
FIGS. 2a to 2c illustrate certain alternative packet routes in a system according to the invention.
Figure 2B:
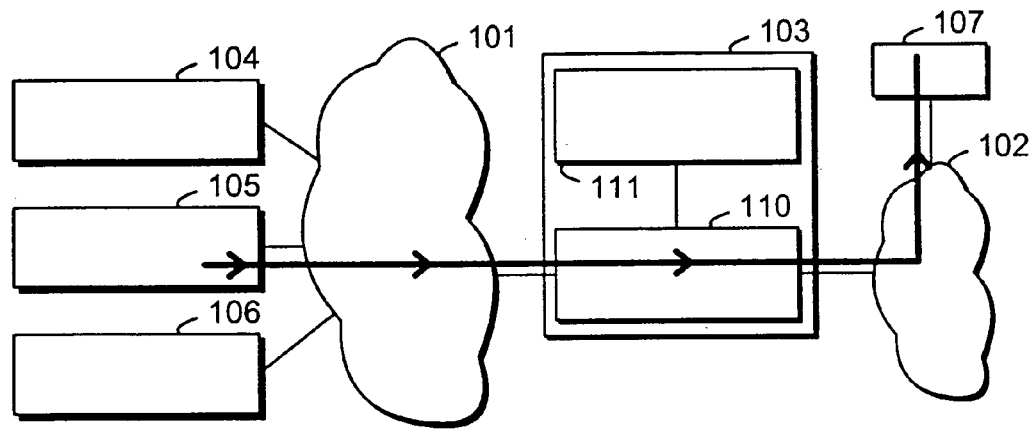
Figure 2C:
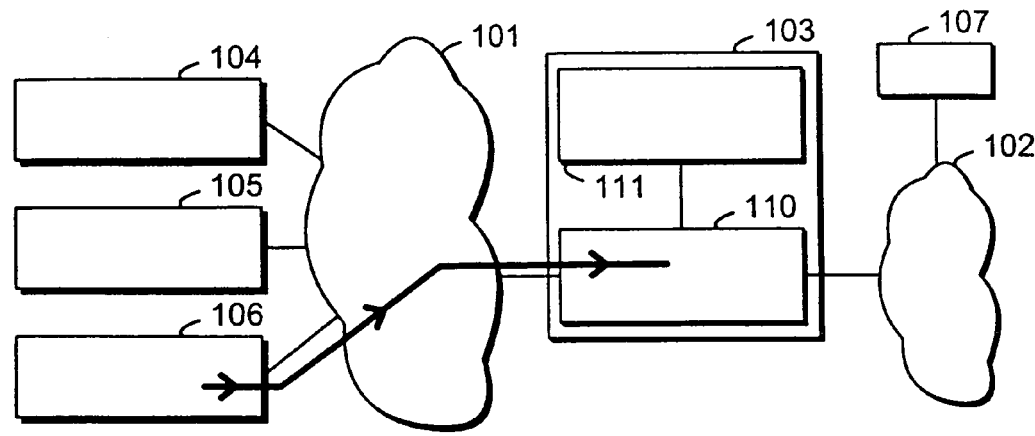

For the purpose of an example we will assume that the application gateway part 111 is strictly specific to protocol A. Additionally we will assume that packets originating from the second source 105 and containing data according to protocol B are considered safe by the firewall device 103. These assumptions together with the forbiddenness of the third source 106 mean that the packet processor part 110 operates as follows: It examines incoming packets from the untrusted packet-switched information network 101 and directs to the application gateway part 111 all packets that come from the first source 104, because they contain data that conforms to protocol A. After application-specific processing in the application gateway part 111 these packets continue to the original intended recipient 107. All packets that come from the second source 105 and contain data that conforms to protocol B are let directly through to the private packet-switched information network 102, while all packets that come from the third source 106 are simply rejected. FIGS. 2a, 2b and 2c illustrate these alternatives respectively.

Division of Functions into Kernel Mode and User Mode

Figure 3:
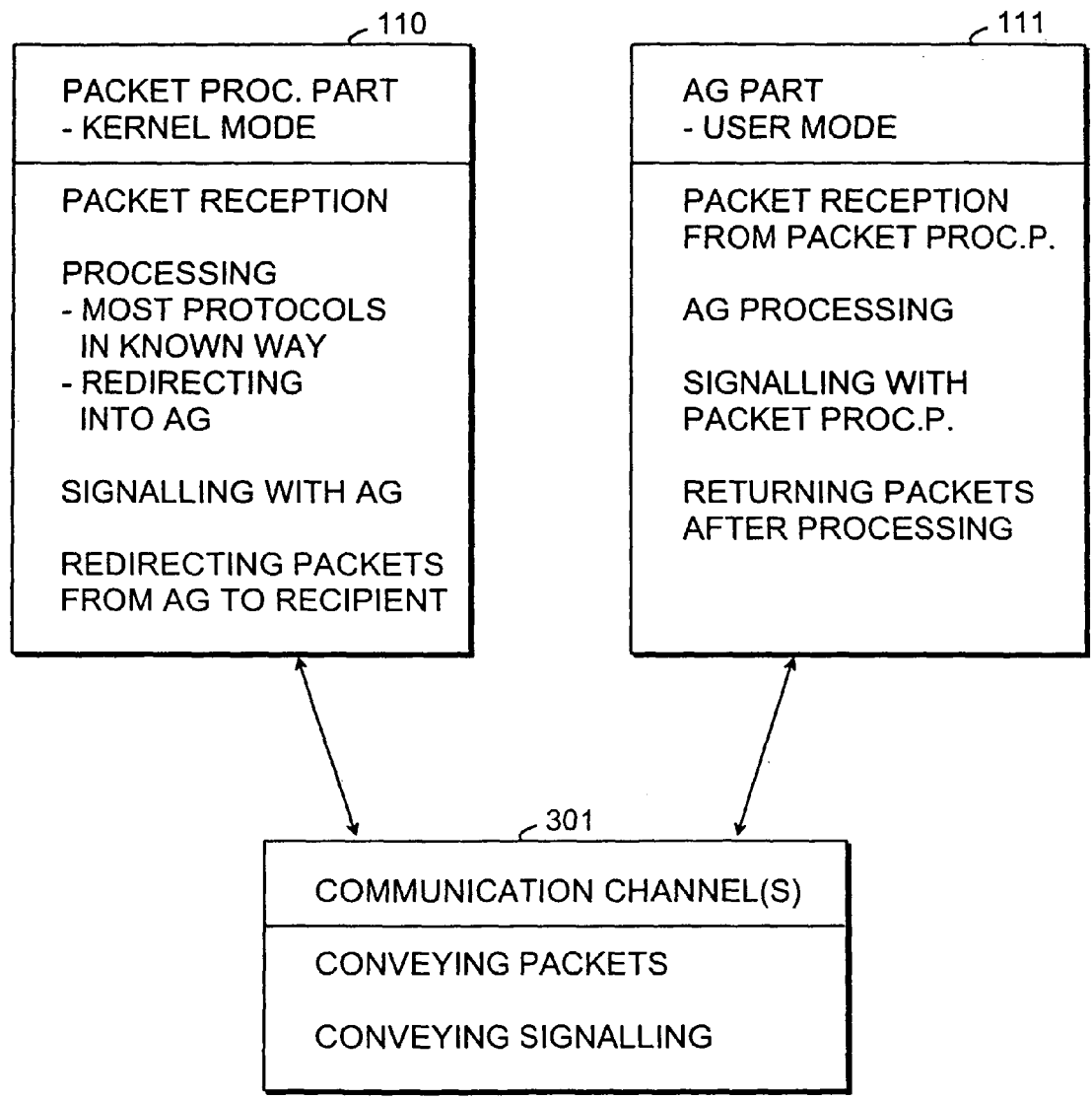
FIG. 3 illustrates the division of functionalities into kernel mode and user mode in the invention.

An important factor that affects the usability and reliability of the application gateway arrangement according to the invention is the division of duties between the packet processor part 110 and the application gateway part 111, and the practical implementation of these divided duties as kernel mode and/or user mode processes. FIG. 3 illustrates these aspects of the invention. A fundamental principle in the division is that the functions that are on the responsibility of the packet processor part 110 are typically implemented as kernel mode processes, while the application gateway part 111 typically operates in user mode. Packet-level filtering is relatively simple to implement, which means that the program code that contains all the filtering instructions is simple and short enough to fit into a typical kernel and to run reliably under a variety of operating conditions, even exceptional ones. On the other hand the packet processor part 110 must also handle all packet traffic that goes through the firewall device, which advocates as fast and efficient continuous operation as possible; this is a further reason for implementing the packet processor part 110 in kernel mode.

Although fast and efficient operation would be advantageous also for the application gateway part 111, it typically involves passages of program code that are too extensive and complicated to qualify as suitable for kernel mode. Regarding the overall operational reliability it is better to implement the application gateway functionalities in user mode.

The packet processor part 110 is responsible for receiving all packets that come through the firewall device. It is also naturally responsible for performing the known tasks of a packet-filtering firewall for all those packets that will not be subjected application gateway processing. We continue assuming that the application gateway is strictly protocol-specific, so all packets that contain data pertinent to other protocols are just subjected to firewall processing at the packet processor part. The variety of possibly encountered other protocols is extremely large, so we may well say that packets that contain data according to most of the possible protocols are never directed from the packet processor part 110 to the application gateway part 111.

For those packets that indeed contain data pertinent to the protocol(s) handled by the application gateway part 111 the packet processor part 110 performs the necessary redirecting operations. In order to keep such redirecting transparent, or at least to keep it from interfering with the continued journey of the packets after application gateway processing, the packet processor part 110 must also signal certain additional information to the application gateway part 111. We will describe both redirecting and signalling in detail later in this description. A yet another task of the packet processor part 110 is the redirecting of processed packets towards their original intended recipients after the application gateway part 111 has returned the packets. The last-mentioned naturally only applies if the application gateway part 111 does not take care of any redirecting independently.

The tasks of the application gateway part 111 are receiving packets from the packet processor part 110, performing the actual application gateway processing, taking part in the signalling of additional information with the packet processor part 110 and returning processed packets so that they can be forwarded towards their original intended recipients.

At least one communications channel 301 must exist between the packet processor part 110 and the application gateway part 111 in order to convey both packets and additional signalling information. The actual implementation of the communications channel 301 can vary depending on whether the packet processor part 110 and the application gateway part 111 are implemented in a single physical device or in at least two different physical devices, and whether the signalling takes place "in-band" (i.e. as an integral part of the stream of conveyed packets) or "out-of-band" (i.e. otherwise).

Different Routings of Packets

FIGS. 4a to 4h illustrate certain alternative routing principles. Here we are only interested in packets that contain data pertinent to a protocol that is in principle handled by an application gateway part 111, so in the following the routing of other kinds of packets is not considered; they would just go through the packet processor part 110 anyway. The communicating parties are a transmitting external host 401 and a receiving internal host 402, or a transmitting internal host 412 and a receiving external host 411 respectively. The fourth party taking part in the packet routing is a packet processor part 110. The illustrations appear in four pairs so that FIGS. 4a and 4b; 4c and 4d; 4e and 4f; as well as 4g and 4h belong together.

Figure 4A:
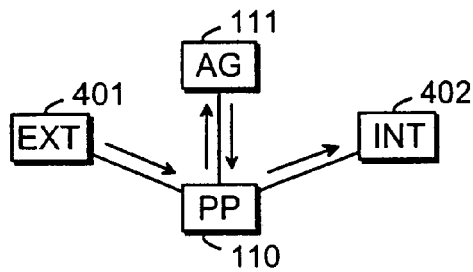
FIGS. 4a to 4h illustrate certain routing alternatives in a system according to the invention.
Figure 4B:
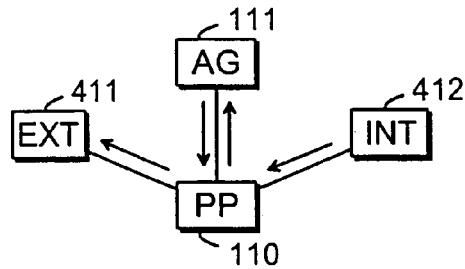

The routing principle illustrated in FIGS. 4a and 4b is the full bidirectional blind track approach, where both the external and internal hosts remain completely unaware of there being an application gateway involved although the packets go through the application gateway part 111. Routing to and from the application gateway part 111 is always performed by the packet processor part 110.

Figure 4C:
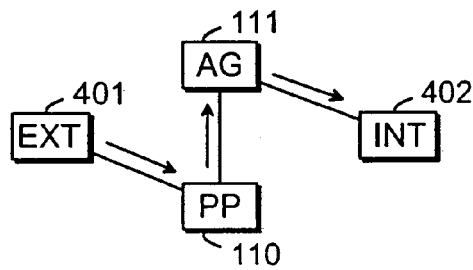
Figure 4D:
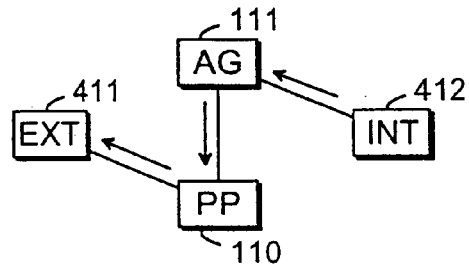

The routing principle illustrated in FIGS. 4c and 4d is the full bidirectional zigzag route approach, where the packets transmitted by an external host 401 to an internal host 402 go through the packet processor part 110 and the application gateway part 111 in this order and continue from the latter directly to the internal host 402, and the packets transmitted by an internal host 412 to an external host 411 follow the same route in reverse direction.

Figure 4E:
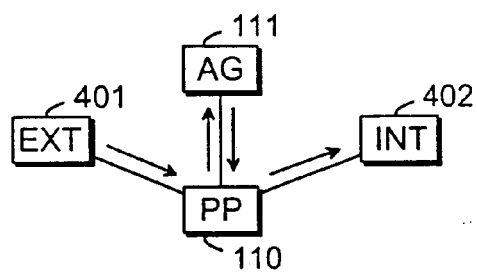
Figure 4F:
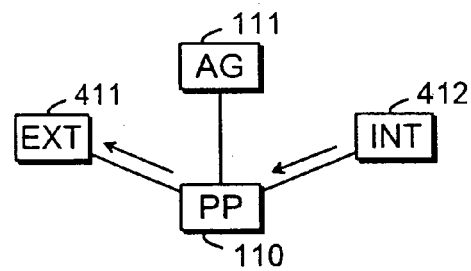

The routing principle illustrated in FIGS. 4e and 4f is one where incoming packets take the blind track route back and forth between the packet processor part 110 and the application gateway part 111, while outgoing packets go straight through the packet processor part 110 without visiting the application gateway part 111 at all. Allowing outgoing packets to bypass the application gateway part 111 reflects an assumption according to which no harm can be caused to the protected network by these outgoing packets, as long as the corresponding incoming packets are subjected to application gateway processing.

Figure 4G:
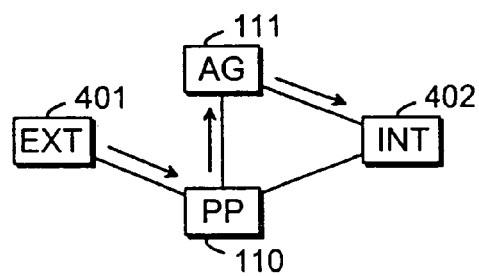
Figure 4H:
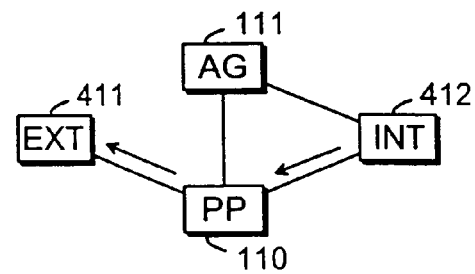

The routing principle illustrated in FIGS. 4g and 4h is one where incoming packets take the zigzag route through the packet processor part 110 and the application gateway part 111, while outgoing packets go straight through the packet processor part 110 without visiting the application gateway part 111 at all.

All those routing principles where packet traffic between the firewall device and both external and internal hosts goes through the packet processor part 110, and the application gateway part 111 only constitutes the end of a blind track, share the advantageous feature that the existence of an application gateway does not require specific configuration of the internal hosts. For example in a situation where a new application gateway is added to handle a protocol that was formerly only dealt with by the packet processor part 110, the only place that requires changes is the packet processor part 110. This is a major advantage if the number of internal hosts is large, like in the private corporate network of a large company.

On the other hand it is perfectly possible, although potentially laborious, to configure the internal hosts so that all outgoing packets that contain data pertinent to the protocol handled by an application gateway are sent within the internal network to the application gateway part 111, while all other outgoing packets are transmitted to the packet processor part 110. It is even possible to make the internal hosts transmit all outgoing packets within the internal network to the application gateway part 111, but such an approach saddles the application gateway part 111 with the additional task of rerouting all such packets to the packet processor part 110 that do not need application gateway processing. The rerouting would actually require a certain packet filtering functionality to be added as a preliminary stage of application gateway processing, which definitively means adding excessive processing and delay.

The laborious task of reconfiguring all internal hosts can be at least partly avoided by instructing the application gateway part to tamper with the incoming packets so that they become to contain appropriate return path instructions for a return path that goes through the application gateway part. This means that all packets that an internal host will transmit as a response to first having received packets through an application gateway part will also go out through the application gateway part without any explicit configuration changes having been made at the internal host.

The embodiments where the application gateway part 111 sends incoming packets directly to their final recipients without circulating them once more through the packet processor part 110 have naturally the advantage that the traffic load at the latter remains smaller. It is indeed one of the duties of the application gateway part 111 to keep track on the intended recipient of each packet it processes, so it is natural that it knows the recipients and is therefore capable of bypassing the packet processor part 110 in sending the processed packets further. Not circulating the processed packets back to the packet processor part 110 appears to be advantageous at least in those hardware arrangements where the application gateway part 111 is physically located in a different computer device than the packet processor part 110.

Physical and/or Logical Machine Compositions

Figure 5A:
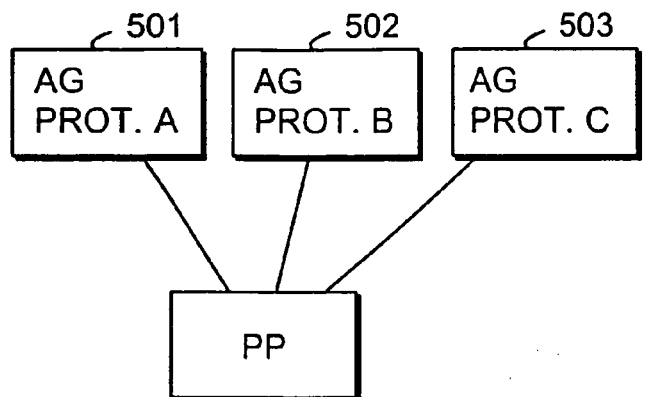
FIGS. 5a to 5c illustrate certain alternatives for device configuration in a system according to the invention.
Figure 5B:
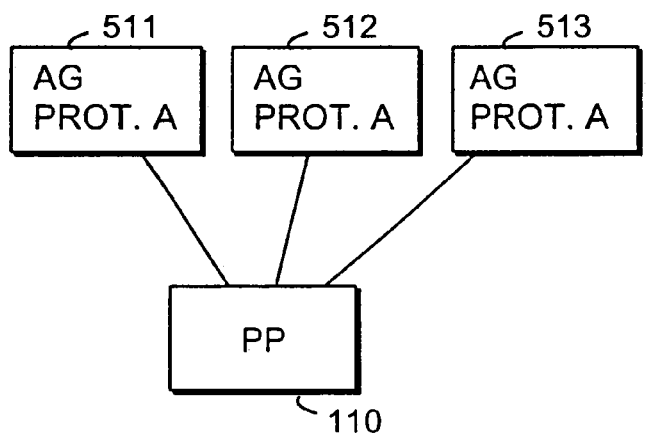
Figure 5C:
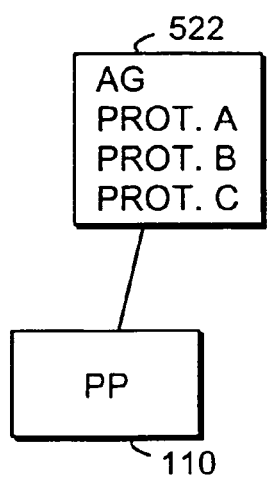

The machine composition for implementing the packet filter and application gateway parts that is simplest in terms of the number of involved devices is the one where both the packet processor part and the application gateway part are implemented in one and only computer device. In some cases it is more advantageous to use two or more devices to put the packet filter and application gateway functionalities into practice. Also in the case of a single physical device there are various alternative possibilities of setting up the architecture that defines the logically different functional entities and their mutual connections. FIGS. 5a, 5b and 5c illustrate certain basic architectural alternatives. In FIG. 5a there are three different application gateways 501, 502 and 503, each of which is arranged to handle a different protocol. Such a modular approach is most advantageous in a situation where frequent changes are possible in the number and/or nature of the protocols that are to be subjected to application gateway processing, because a certain change only affects a small part of the general arrangement and leaves most of it untouched.

In FIG. 5b there are likewise three different application gateways 511, 512 and 513, but this time each of them is arranged to handle the same protocol. This approach is most advantageous in a situation where large variations are possible in the volume of packet traffic that needs to be subjected to application gateway processing. The packet filter 110 may follow the loading situation of each application gateway and use its routing capability to distribute the processing tasks as equally as possible, or according to some other distribution rule. In FIG. 5c there is only one physical device 522 for implementing the application gateway processing according to any of a number of protocols.

All kinds of combinations of the basic principles illustrated in FIGS. 5a, 5b and 5c are possible. Any of these principles and their combinations can also be used together with any of the routing principles described previously. Yet another possibility is to set up at least two parallelly operating packet processor parts that together use the same application gateway part(s).

Signalling in General

In order for the application gateway part to be able to perform efficient application gateway processing it must obtain information about the original source address, source port, destination address and destination port values of a packet it receives. In those cases where the application gateway part receives outgoing packets directly from an internal host this task is trivial. However, much more complicated situations arrive in those much more typical cases where the application gateway part receives packets from the packet processor part. This is especially true if the packet processor part also performs NATs (Network Address Translations).

Performing a NAT means generally that a network node, typically a firewall device, translates an IP address used within one network to a different IP address known within another network. For example a company may use a firewall device to map its local inside network addresses to one or more global outside IP addresses and correspondingly unmap the global IP addresses on incoming packets back into local IP addresses. Performing a NAT, or NATting, is a known way to enhance security, because each outgoing or incoming request must go through a translation process that also offers the opportunity to qualify or authenticate the request or match it to a previous request. NATting also conserves on the number of global IP addresses that a company needs. It lets the company use a single IP address in its communication with the world. NATting has been treated in an IETF (Internet Engineering Task Force) document RFC 1631, where the acronym RFC comes from Request For Comments. Said document is incorporated herein by reference.

NATting as such is a very advantageous way of achieving the desired redirecting of packets from the packet processor part to the application gateway part. A first reason for its advantageousness is that it is straightforward to perform with well-tested, robust and yet simple kernel mode routines that exist as such and are known as such. A second reason is that it does not increase the size of any packet so processed, which means that it is guaranteed not to cause packet size overflow even if the size of a certain packet to be processed was already at or very close to a certain maximum limit. A third reason is that NATting requires little or no specific attention to be paid to the devices and/or processes that take care of actually taking the packet from the packet processor part and carrying it to the application gateway part, regardless of the location of the packet processor part and the application gateway part within devices and/or networks: a NATted packet comprises, at the appropriate field, a destination address that identifies the application gateway part as its destination. It lies within the very essence of practically operable packet-switched networks that efficient and reliable devices and processes exist for taking each packet to the destination that is indicated in the packet's destination address. The packet processor part can simply leave it to the responsibility of the normal routing processes to take care of actually carrying NATted packets to the application gateway part.

It should be noted that NATting is available as means for redirecting packets from the packet processor part to the application gateway part regardless of whether the former uses NATting for anything else. Additionally it should be noted that just in order to redirect a packet to an application gateway part it is not required to touch the original source address of the packet at all. The packet processor part might leave the source address as it is, and only replace the destination address with that of the application gateway part. This would eliminate the need for separately signalling the original source address from the packet processor part to the application gateway part. Throughout this description wherever signalling of original source and destination addresses is mentioned one should keep in mind that signalling only the original destination address is sufficient if the redirecting operation left the source address untouched.

NATting also the source address is useful if the application gateway part is to return processed packets to the packet processor part, because then returning could be simply accomplished by swapping the source and destination addresses of each packet at the application gateway part and leaving it to the normal network routines to actually carry the packet back to the packet processor part. Embodiments of the invention can be produced where it is not necessary to use packet-associated signalling to make the application gateway part aware of the packet processor part's address. For example, if the application gateway part is located at the end of a "blind track", one may simply define that all packets that leave the application gateway part should always go to the packet processor part because they have nowhere else to go. Alternatively the application gateway part may be separately configured to return packets to the packet processor part, without requiring the packet processor part to transmit its address every time when original values of address fields are signalled.

A NATted packet that comes from the packet processor part to the application gateway part does not explicitly reveal to the latter all required information. Therefore the packet processor part must take specific action to provide the application gateway part with the necessary information. We will refer to all such specific action measures as signalling. One should note that signalling is not necessarily unidirectional from the packet processor part to the application gateway part. The term signalling is meant to cover also the transmission of other information than just the packets themselves from the application gateway part to the packet processor part. Signalling may take place in-band, which means that the signalled information is carried in one way or another as a part of the stream of TCP/IP packet that is being transferred between the packet processor part and the application gateway part. The other possibility is out-of-band signalling, which means that some other means are utilized.

In order to simplify the structure of the application gateway part proper one may use a simple deNATting/reNATting layer in immediate association therewith. Such a layer would be located next to the application gateway part between it and the packet processor part. The deNATting/reNATting layer is in such embodiments the peer entity of the packet processor part regarding signalling. The packet processor part directs a packet towards the application gateway part and informs the deNATting/reNATting layer about the original source and destination information of the packet. The deNATting/reNATting layer receives the packet, performs deNATting by replacing the NATted source and destination information values with the original ones it received through signalling, and passes the deNATted packet to the application gateway part. The latter processes the packet as if it had received it directly from its original source, and remains unaware of the packet having already experienced NATting in a packet processor part and deNATting at a deNATting/reNATting layer. After the application gateway part has processed the packet it either forwards it directly towards its original destination, or gives it to the deNATting/reNATting layer for returning to the packet processor part. In the latter case the packet is subjected to reNATting and source/destination switching at the deNATting/reNATting layer, which causes it to return to the packet processor part.

The description of all embodiments of the invention where the packet processor part is said to practice signalling with the application gateway part can be generalized by taking into account that such signalling can also take place between the packet processor part and an deNATting/reNATting layer next to the application gateway part.

Inband Signalling

A first possible way of transmitting the signalled information in-band is to utilize TCP's known URGENT POINTER field and URG bit so that in a packet that contains signalled information the transmitting party sets the URG control bit and inserts into the URGENT POINTER field the current value of the urgent pointer as a positive offset from the sequence number in the corresponding TCP segment. The urgent pointer points to the sequence number of the octet following the urgent data, which in this example is the signalled information. In practice the signalled information would be placed at the very beginning of the TCP payload so that the value at the URGENT POINTER field tells, where in the TCP payload is the point where the signalled information ends and the actual, original TCP payload begins.

A second possible way of transmitting the signalled information in-band is related to the first in that a conventional feature of the TCP/IP protocol is used: one may utilize one or both of the Options fields that are present in both the IP and the TCP header portion of each TCP/IP packet. The rules that govern the use of the Options fields are known e.g. from the IETF Request For Comments documents number RFC 791 (IP) and RFC 793 (TCP) that are incorporated herein by reference.

A third possible way of transmitting the signalled information in-band is to utilize another conventional protocol as an encapsulation for a TCP/IP packet and the associated signalled information. For example one may encapsulate them into a Socks packet. Socks is a known protocol that a proxy server can use to accept requests from client users in a company's network so that it can forward them across the Internet. Socks uses sockets to represent and keep track of individual connections. More information about Socks can be found in an IETF document RFC 1928, which is incorporated herein by reference.

A fourth possible way of transmitting the signalled information in-band is to utilize certain customized protocol features that are defined just for this purpose. For example one may prescribe that the transmitting party always inserts the signalled information right after the header of a packet and before the payload part. Or the transmitting party may compose a completely new header that serves just to direct a packet to the receiving party, and prepend this new header to a conventional packet before the original header. The receiving party then just strips the appended header and reads the "signalled" information from the original header as if it had just received the packet from its original sender. Customized protocols work well if one can be sure that both the transmitting and receiving ends are familiar with the customization, and that the transmission channel therebetween does not cause distortions to the non-standard protocol features.

All in-band signalling mechanisms have one at least theoretically serious drawback. A packet that arrives at a packet processor part may already have a size equal to the absolute maximum tolerable packet size. In that case it is impossible to add any new fields or new headers or use any enveloping for inserting signalled information.

It is possible to use fragmenting defined in the known TCP/IP standards so that in case the addition of signalling information causes a maximum packet size overflow, the transmitting party simply fragments the resulting overgrown packet into two or splits it into two TCP packets (according to established language of this field fragmenting refers to manipulating packets on the IP level, while splitting refers to the TCP level). However, preparing for fragmenting or splitting would require the implementation of an almost complete TCP/IP stack, which is not desirable for an efficient kernel mode process such as a packet processor part.

Especially in embodiments where the packet processor part and the application gateway part are physically located in a single computer device one may define an internal MTU (Maximum Transmission Unit) that is large enough to accommodate any imaginable combinations of large TCP/IP packets and associated signalling information. This approach would dissolve the above-mentioned drawback because no matter how large the TCP/IP packet, internally one would always be allowed to add signalled information to it. However, such a solution would tend to limit the applicability of the invention, because it necessitates permission to modify the TCP/IP protocol stack as well as certain operating system features. Generally it is impossible to assume that even the internal MTU of a computer could be made arbitrarily large, because limitations in certain operating systems may set an absolute upper limit. It should also be noted that if the packet processor part and the application gateway part are not physically located within a single computer device, the transmission path therebetween may set limitations to packet size.

The drawback of potential maximum packet size overflow is actually not that serious, if we assume that not every packet needs to contain signalled information. It is very reasonable to assume that the need for signalled information will concentrate to the initiation phase of each TCP connection. The first packet that initiates a TCP connection is the so-called SYN packet, which comes almost always without any specific payload. The TCP standard itself allows data to be transmitted already in the SYN packet, but practice has shown that a vast majority of transmitted SYN packets are indeed empty so they are well suited for fattening up with some signalled information.

Out-of-Band Signalling

A first possible way of transmitting the signalled information out-of-band is to utilize the well-known UDP (User Datagram Protocol) that offers a limited amount of service when short messages are exchanged between computers in an IP network. It is known that network applications that want to save processing time because they have very small data units to exchange (and therefore very little message reassembling to do) may prefer UDP to TCP. The piece of signalled information is typically small enough to fit into a single UDP packet, so the transmitting party may simply compose an UDP packet with the signalled information as payload and transmit it to the receiving party. Composing and handling UDP packets of limited amount of readily available information is well within the scope of a kernel mode packet processing engine.

A second possible way of transmitting the signalled information out-of-band is to utilize some other known protocol than UDP, or indeed even a custom-built signalling packet exchanging protocol, for the same purpose.

A third possible way of transmitting the signalled information out-of-band, being only possible though in embodiments where the packet processor part and the application gateway part are physically located in a single computer device, is to utilize any of the known communications channels between kernel mode processes and user mode processes. Such communications channels are usually strictly specific to certain operating systems. For example in unix-type systems there exist several ways of utilizing sockets and socket reading functions that carry names such as recv, recvfrom, or recvmsg. Another unix-related possibility is to communicate through socket options; applicable functions carry names such as getsockopt and setsockopt. Yet other unix-related system functions that can be used are the known IOCNTL and FCNTL functions, the corresponding longer names being input-output control and file control respectively.

All out-of-band signalling schemes involve the problems of ensuring that the signalled information indeed reaches its destination and that it is correctly associated with the transmitted packets that it describes. Questions of the latter kind are addressed below under the header "connection identification". Regarding the task of ensuring delivery, certain alternative options are again available. The most straightforward approach is to just send each out-of-band signalling message once and accept the fact that if the message is somehow lost, corrupted or fatally delayed, the signalled information will not reach its destination and the process that would have needed it will fail. This approach is not as bad as one might assume at first sight, because both the physical distance (in terms of cable length) and the logical distance (in terms of number of processes and devices that take part in handling the signalling message) involved are relatively short compared to general transmission over worldwide networks and the transmission reliability is therefore relatively high. Transmission reliability can be further enhanced through simple redundancy: instead of transmitting just once, each signalling message is transmitted in several copies.

A more elaborate out-of-band signalling scheme is based on bidirectionality and information-on-demand. Signalling messages are therein not transmitted spontaneously but only as responses to a query. For example when the application gateway part has received packets for which it does not yet know the required information about original source and destination, it sends an UDP packet to the packet processor part and lists therein the source/destination information it observed in a TCP/IP packet received from the packet processor part. The latter then responds to the querying UDP packet by returning another UDP packet that contains the required signalled information.

A hybrid out-of-band signalling scheme may also be presented combining the features of (redundant) spontaneous and responsive out-of-band signalling. According to the hybrid scheme the transmitting party sends one or more signalling messages spontaneously, and the receiving party only sends an inquiry if it still did not receive any signalling message within a certain time after it received a TCP/IP packet for which it needed information about original source and destination. The hybrid scheme (as well as the "more elaborate" scheme described above) can be based on the use of UDP or any other suitable messaging protocol.

Connection Identification

TCP/IP packets come in discrete packet streams, which is equal to saying that each TCP connection has a beginning, a limited duration and an end. During a TCP/IP connection the source and destination addresses and port numbers do not change, which means that is would be most economical to only make the packet processor part indicate to the application gateway through signalling the required information once per each connection, not packet per packet. This means that the event that triggers the signalling process is either the arrival of the first packet of a new TCP connection at the packet processor part, or—in embodiments based on interrogative signalling—the arrival of the first packet of a new TCP connection at the application gateway part, said packet having been redirected to the application gateway part by the packet processor part.

Only signalling the required information once per connection works fine, if the packet processor part does not change the original contents of the destination address field during redirecting or if one can be sure that no such simultaneous connections will occur that would be at risk of being confused. Changes in the original contents of the destination address field do not occur in those embodiments where the packet processor part prepends some new headers to the redirected packets, or more generally in all such embodiments that retain essentially all of the original header information readable in the redirected packets. The question of potentially confused simultaneous connections is highlighted in the following example.

Let us assume that a user at machine A initiates an ftp (file transfer protocol) connection to machine ftp1.company.com and a bit later to a different machine ftp2.company.com, and company.com has implemented a packet filter/application gateway system according to an embodiment of the present invention. The packet processor part with a stateful filtering engine is in machine fw.company.com. Let us further assume that the application gateway part handling all ftp traffic sits at port 1111 of a machine ag.company.com. Now, the packet processor part redirects the packets of the first connection to port 1111 of ag.company.com, and the ftp-handling application gateway part is informed that these packets should end up at the conventional port for ftp connections at ftp1.company.com. Later, when the user initiates the second connection to the second machine, the packet processor part redirects the packets that belong to this second connection to port 1111 of ag.company.com, and informs the ftp-handling application gateway part that these should go to ftp2.company.com.

Now the redirected packets of the second connection come from the same machine and same port as the first connection and end up at the same machine (machine ag.company.com)

and the same port (port 1111) as the first connection. How can ag.company.com differentiate between these two connections? Actually, it cannot, if it only considers address and port information.

A naive solution would be to make the packet processor part include some kind of a connection identifier to all redirected packets. This adds communication overhead, might cause MTU problems, and is generally a bad idea.

A much better solution is to use a range of ports at ag.company.com, and make sure that the combination of source address/source port/destination address/destination port is unique for each connection that has been redirected to proceed via ag.company.com. This means that the packet processor part must choose the destination port for each separate TCP connection so that a unique combination is always obtained.

What if the machine A is a massive firewall machine (performing NAT) of some large corporation, so that the number of possible connections from A to company.com might be extremely large? UDP and TCP protocols have 65536 ports, so reserving, say, 1000 ports or even more for the range mentioned above would be possible. That would be enough for 1000 simultaneous connections from the machine A to systems in company.com. This limit can further be increased by arranging the packet processor part to change also the source address and port information in the packets, and indicating these along with the original destination information as discussed above. The packet processor part can, for example, change the source address and port information to refer to those of the firewall computer, fw.company.com, or any other suitable address. If both source port and destination port are used for identifying the connection and a range of 1000 ports are reserved for this use at fw.company.com and ag.company.com, 1000*1000 connections i.e. one million connections could be uniquely identified.

Packet Restoration

In those embodiments of the invention where the packet processor part receives processed packets from the application gateway part and transmits them further towards their original intended recipient there must exist a mechanism for restoring the packets so as to complete the transparency of the application gateway processing. In other words the packets that have been subjected to application gateway processing must leave the packet processor part as if they had never been diverted from their original route.

An advantageous solution for packet restoration goes as follows. At the beginning of a TCP connection, when the packet processor part for the first time sets up a certain relationship between original source/destination information and the modified source/destination information that is used to redirect the packet to the application gateway part, it stores this relationship in a look-up table. The modified source/destination information serves to bring the packet to the application gateway part, which performs its task and processes the packet. Similar replacing of the source/destination information is performed for all packets of the corresponding TCP connection. After having processed a packet the application gateway part switches the source and destination parts of the modified packet header, which causes the packet to be routed back to the packet processor part. There the occurred reversal of the source and destination parts of the modified packet header is taken into account when the packet processor part uses the previously mentioned look-up table to identify the original source/destination information. The packet processor part replaces the modified, switched source/destination information with the original source/destination information, after which the packet is ready to be transmitted further.

Changes in the source/destination information fields in the way explained above may be called "double NATting". The packet processor part NATs a packet for the first time in order to redirect it to an application gateway part. When the packet returns from the application gateway part after having been subjected to application gateway processing, the packet processor part NATs it for the second time in order to release it towards its original destination.

It is also possible to make the application gateway part restore the packets, because as was noted in the general description of signalling, the application gateway part needs to know the original source and destination information for the application gateway processing to be meaningful. Restoring the packets at the application gateway part is even mandatory in those embodiments of the invention where the packets do not go through the packet processor part any more after application gateway processing. Restoring packets at the application gateway part means simply that after having processed a packet the application gateway part reads the original source and destination information pertinent to that packet from its memory and writes it into the appropriate fields in the packet's header before releasing the packet for transmission towards its original intended recipient.

Care must be taken if the packet processor part and the application gateway part are physically implemented in a single computer device and if it is on the responsibility of the application gateway part to restore the packets. By default, namely, the packet processor part will have no means for telling an already processed packet from one that still awaits to be redirected to the application gateway part. Some means must be provided for keeping packets from ending up in an endless loop between the packet processor part and the application gateway part.

Dynamic Changes in Packet Processing

In the foregoing we have implicitly assumed that the packet processor part operates according to some relatively fixed set of instructions regarding redirection of packets to the application gateway part. Indeed, in simple embodiments of the invention such fixed instructions are given to the packet processor part at the time when an application gateway is installed or the operation of an installed application gateway is modified. However, the invention encompasses also embodiments where dynamic changes in packet processing are possible. Dynamic changes in this sense mean that at least one of the packet processor part and the application gateway part discovers something in the stream of packets that requires a different packet handling strategy to be implemented than before, and takes action in order to implement such a different packet handling strategy.

As an example we may consider a situation where an application gateway part is in general arranged to handle packets that pertain to ftp. Initially, however, a packet processor part is instructed to redirect only packets that contain ftp control channel signalling to the application gateway part. Packets that are related to an ftp data channel would have a different port number than those related to the ftp control channel signalling, and therefore it is possible that initially the packet processor part is not instructed to redirect them to the application gateway part. According to the principle of dynamic changing the application gateway part may respond to the arrival of certain ftp control channel signalling by asking the packet processor part to change its redirecting strategy so that also the ftp data channel packets will be redirected, for example in order to check for viruses that might come embedded in a file transferred over the ftp data channel.

Some protocols require two or more port numbers for themselves. An example is the Real Time Protocol or RTP, which is discussed in the known IETF document RFC 1889. It requires two consecutive port numbers of which one is for data and the other is for control. Dynamic changes can be utilized so that when an RTP application gateway part detects the arrival of RTP-related packets that have a certain port number, it instructs the packet processor part to add a new redirection rule according to which packets that have the immediately adjacent port number must also be redirected.

It is not necessarily the application gateway part that reacts to achieve dynamic changes in redirecting. At least in cases where a certain protocol requires two or more port numbers for itself and these port numbers are easy to deduce from each other (like in the case of two consecutive port numbers), the packet processor part can achieve dynamic changing for itself. When the packet processor part has detected a packet that has a certain port number, analysed the packet enough to find out that it contains data that pertains to a certain protocol, and consequently decided to redirect it to a certain application gateway part, the packet processor part may by itself deduce the other port number(s) that must necessarily mean pertinence to the same protocol. Thus the packet processor part may define new instructions for itself to redirect also packets that have such other port number to the application gateway part.

Dynamic changes may naturally involve more than one application gateway parts. Even if a certain first application gateway part was in one way or another involved in detecting the need for a dynamic change, the dynamic change may result in new redirecting instructions for the packet processor part that concern some second application gateway part.

Method Diagrams

Figure 6A:
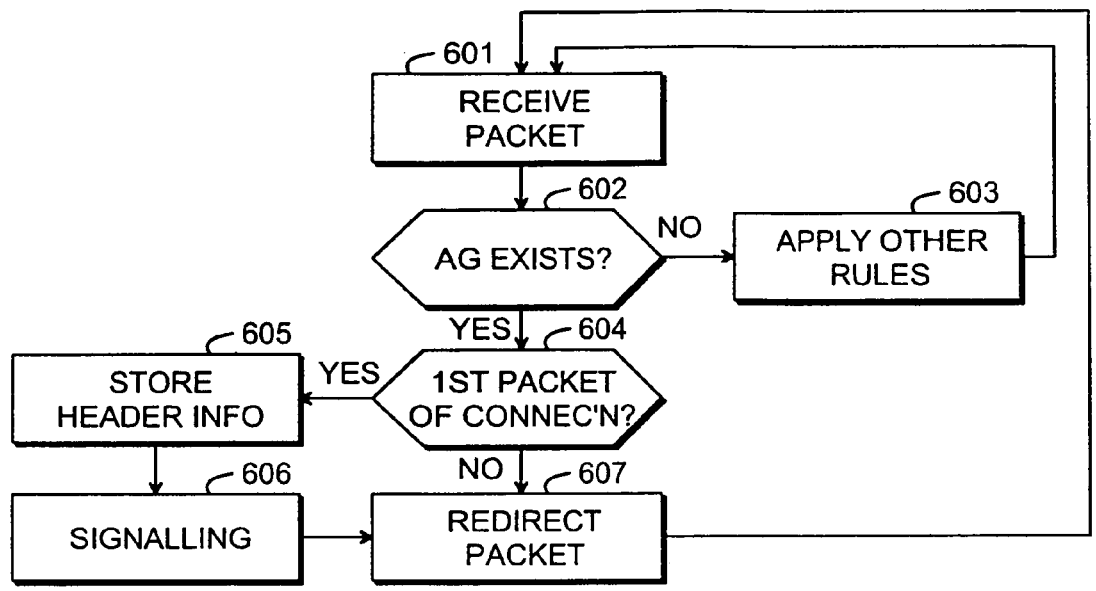
FIGS. 6a to 6c illustrate methods according to certain embodiments of the invention.
Figure 6B:
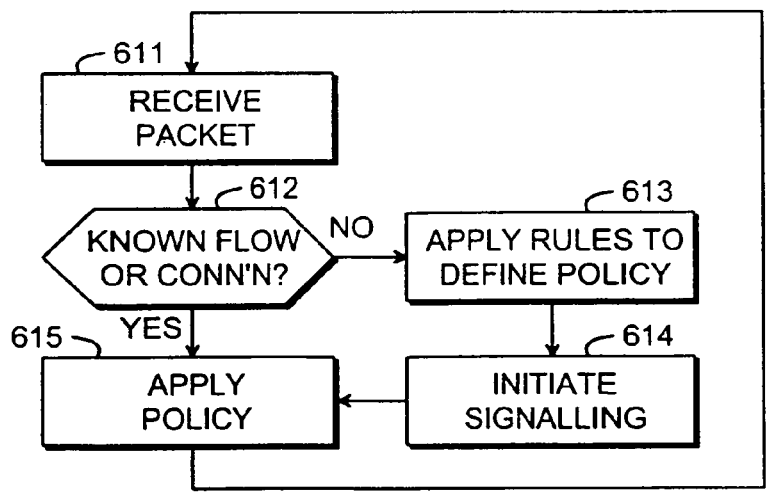
Figure 6C:
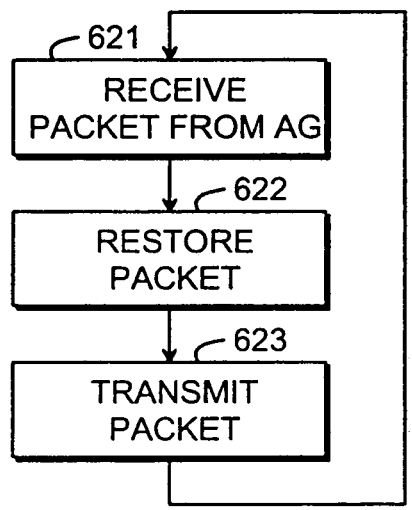

FIGS. 6a, 6b and 6c illustrate schematically the main features of the methods executed by the packet processor part according to the invention. FIG. 6a pertains to the phase where a packet processor part that applies packet-level filtering rules receives a packet that it has not yet processed. At step 601 the packet processor part receives a packet and examines it enough to tell, whether the packet contains data that pertains to a certain known protocol. At step 602 the packet processor part checks, whether it knows about an application gateway part that is specialized in handling a protocol that was identified in the packet. We assumed that this packet processor part applies certain packet filtering rules, so the check that is performed at step 602 can be understood as applying at least one of these rules and arriving at a positive finding: the rule states (or: the rules state) that the packet in question is to be redirected to the appropriate application gateway part. A negative finding at step 602 causes the packet to be just processed at step 603 according to certain other (preferably stateful) packet filtering rules, followed by a jump back to step 601. In a case where outgoing packets related to certain protocol X are not subjected to application gateway processing even if incoming packets related to protocol X are, receiving an outgoing packet results in a negative finding at step 602 because the data in the packet does not pertain to the combination of protocol X and the correct transmission direction.

A positive finding at step 602 means that the packet processor part should redirect the packet to the appropriate application gateway part. In order not to omit its signalling duties, the packet processor part checks at step 604, whether the packet in question is the first packet of a TCP/IP connection. If it is, there follows a transition to step 605 in which the packet processor part stores the appropriate header information from the packet. Step 606 represents signalling in general; in case of push-type signalling the packet processor part takes spontaneous action to signal the appropriate header information to the application gateway part, and in case of pull-type signalling it prepares for responding to a query from the application gateway part (the actual querying and responding round may take place later). Step 606 may even represent no action being taken at all, if the implemented embodiment of the invention is such where redirecting leaves the original source and destination information readable in the redirected packet. Either a negative finding at step 604 or the completion of step 606 lead to step 607, where the packet is redirected to the application gateway part.

FIG. 6b illustrates an alternative, more general situation where the assumption of using packet-level filtering rules for packet processing is not required. FIG. 6b is applicable to e.g. connection-oriented of flow-oriented processing where a packet is regarded as belonging to a certain connection or flow if certain features in the packet match with the corresponding features of other, previously handled packets and possibly if some other constraints are met regarding e.g. time intervals between packets or maximum length of a connection or flow in time or number of packets. It is typical to connection or flow oriented processing that detailed considerations about how should a certain connection or flow be handled are only made when the first packet of a certain connection or flow arrives, and thereafter the rest of the packets that belong to the same connection or flow as the first one are handled the same way without every time going through the same detailed considerations again. Regarding the invention it is noted that if the packet processing part finds that the first packet of a certain connection or flow should be redirected to an application gateway part, it is evident that the subsequent packets of the same connection or flow should be handled in similar way, as long as the concept of connection or flow is defined accurately enough to exclude changes of protocol in the middle of a connection or flow.

At step 611 the packet processor part receives a packet. At step 612 it checks, whether the received packet belongs to a connection or flow that is already known and for which a packet-handling policy has been established. If not, i.e. if the received packet is the first packet of a new connection or flow, certain rules are applied at step 613 in order to determine, what is the appropriate way of handling packets that belong to such a new connection or flow. Without loss of generality we may say that at step 613 the packet processor part defines a policy for handling the newly received packet as well as all subsequent packets that will be found to belong to the same connection or flow. At step 615 it applies this policy; the part of step 615 that is important to the present invention is that if the connection or flow was found to contain packets that require processing at an application gateway part, step 615 means redirecting the packet thereto. In order to accommodate signalling to the method of FIG. 6b a signalling initiation step 614 has been shown. When a new connection or flow has been discovered and the policy for handling its packets has been defined, some kind of signalling must also be initiated similarly as in the case of FIG. 6a.

FIG. 6c pertains to the phase where the packet processor part receives a packet that has already been subjected to application gateway processing. At step 621 the packet processor part notices that the source from which the packet was received is actually (one of) the known application gateway part(s), which means that there only remain the tasks of restoring the packet at step 622 and transmitting it further towards its original intended recipient at step 623.

Figure 7A:
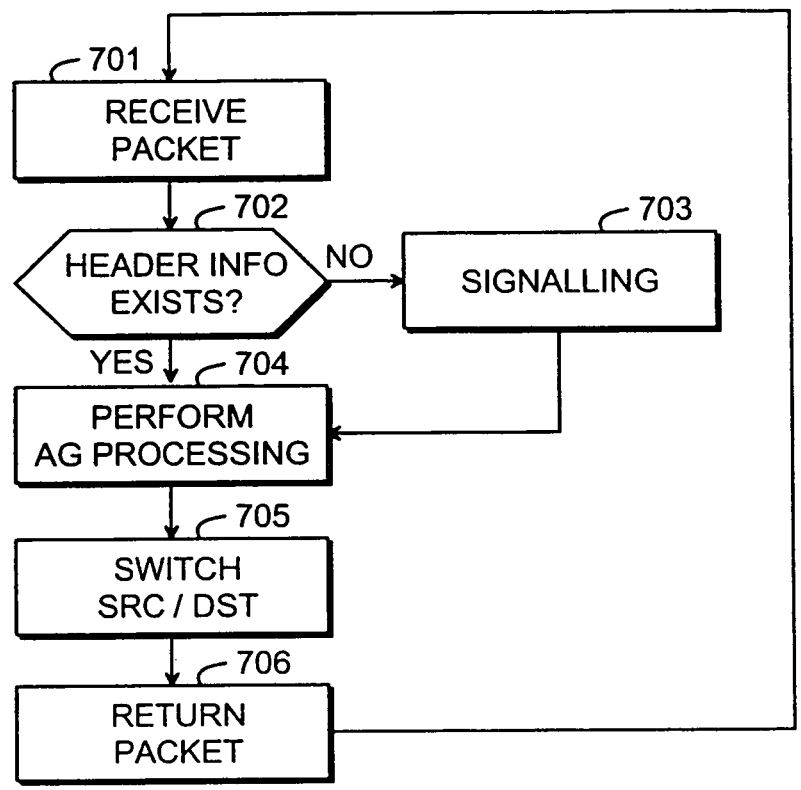
FIGS. 7a and 7b illustrate methods according to certain other embodiments of the invention and FIGS. 8a and 8b are block diagrams of arrangements according to certain embodiments of the invention.
Figure 7B:
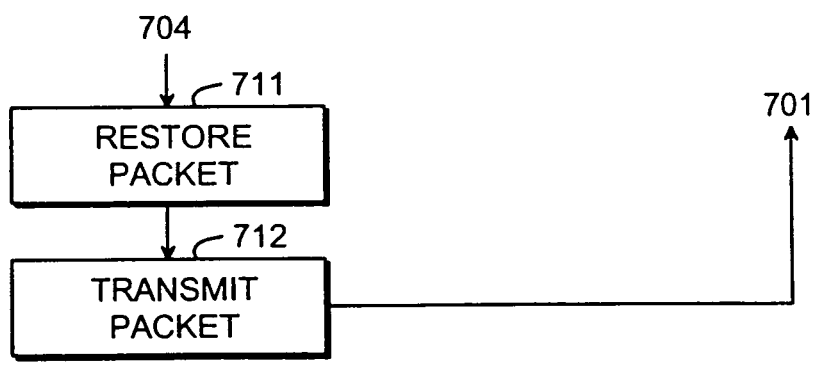

FIGS. 7a and 7b illustrate schematically the main features of the methods executed by the packet processor part according to the invention. FIG. 7a pertains to the "blind track" embodiments of the invention where the application gateway part receives packets only from a packet processor part and returns processed packets through the same route. At step 701 the application gateway part receives a packet and examines, which TCP/IP connection the packet belongs to. At step 702 the application gateway part checks, whether it already knows the original source and destination information that describe the identified TCP/IP connection. A negative finding at step 702 causes a transition to step 703, which again represents only generally all the signalling tasks that aim at determining the appropriate original source and destination information. In push-type signalling step 703 means checking, whether the packet processor part has already provided this information spontaneously. If not, step 703 means waiting for such information. In pull-type signalling step 703 means transmitting a query to the packet processor part. If the implemented embodiment of the invention is such where redirecting leaves the original source and destination information readable in the redirected packet, step 703 will not become actual because the application gateway part notes already at step 702 that it has already all necessary information.

After the application gateway part has all necessary source and destination information it can start the actual application gateway processing at step 704. For those packets that pass the application gateway processing there comes step 705, in which the source and destination values of the packet are exchanged. This facilitates easy returning of the packet to the packet processor part at step 706. FIG. 7b illustrates an alternative sequence of steps after steps 704; here the packet is restored at step 711 to ensure transparency of the application gateway processing, and transmitted further at step 712. The sequence of FIG. 7b is most pertinent to those embodiments of the invention where the application gateway part forwards incoming packets towards their intended recipients in an internal network without bothering the packet processor part any more with these packets.

Block Diagrams

Figure 8A:
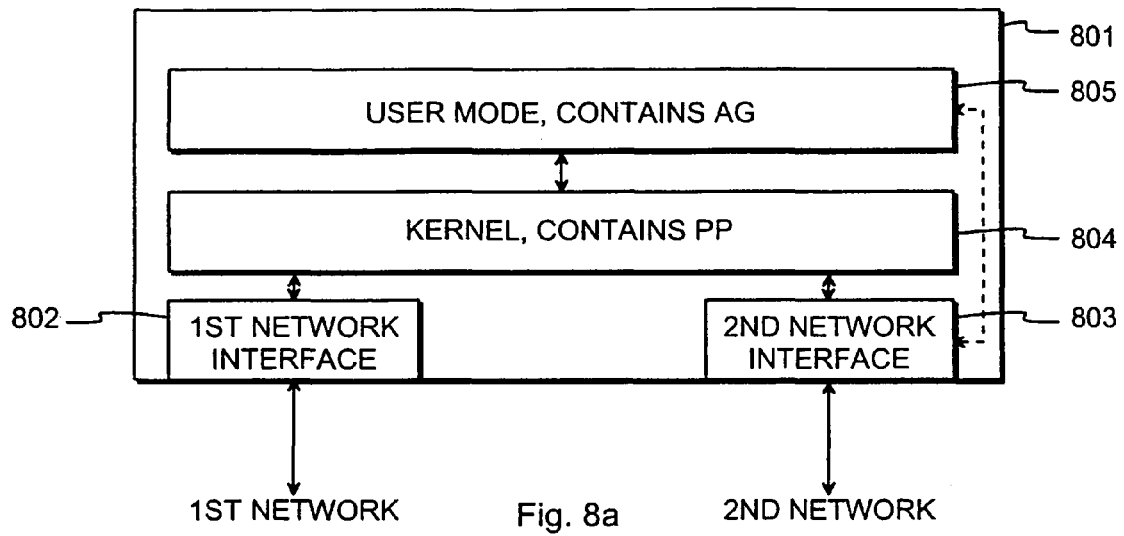

FIG. 8a illustrates schematically a firewall device 801 that has a first network interface 802 for communicating with a first network and a second network interface 803 for communicating with a second network. The first and second networks correspond to the previously mentioned external and internal networks respectively. The operating system kernel 804 is illustrated as communicating bidirectionally, i.e. transmitting and receiving packets, with both the first 802 and second 803 network interfaces. According to an important aspect of the invention the kernel 804 contains (preferably stateful) packet processor functionality that is arranged to execute the methods illustrated in FIGS. 6a or 6b and 6c. There is also illustrated a user mode entity 805 that has a bidirectional communication connection for both exchanging packets and signalling with the kernel 804. According to another important aspect of the invention the user mode entity 805 contains application gateway functionality that is arranged to execute the method illustrated in FIG. 7a, or the modified method illustrated by replacing the appropriate steps of FIG. 7a with those of FIG. 7b. The optional bidirectional communication connection illustrated as a dashed line between blocks 803 and 805 represents the possibility of the application gateway functionality transmitting and receiving packets directly to and from the second network without routing them through the packet processor functionality.

Figure 8B:
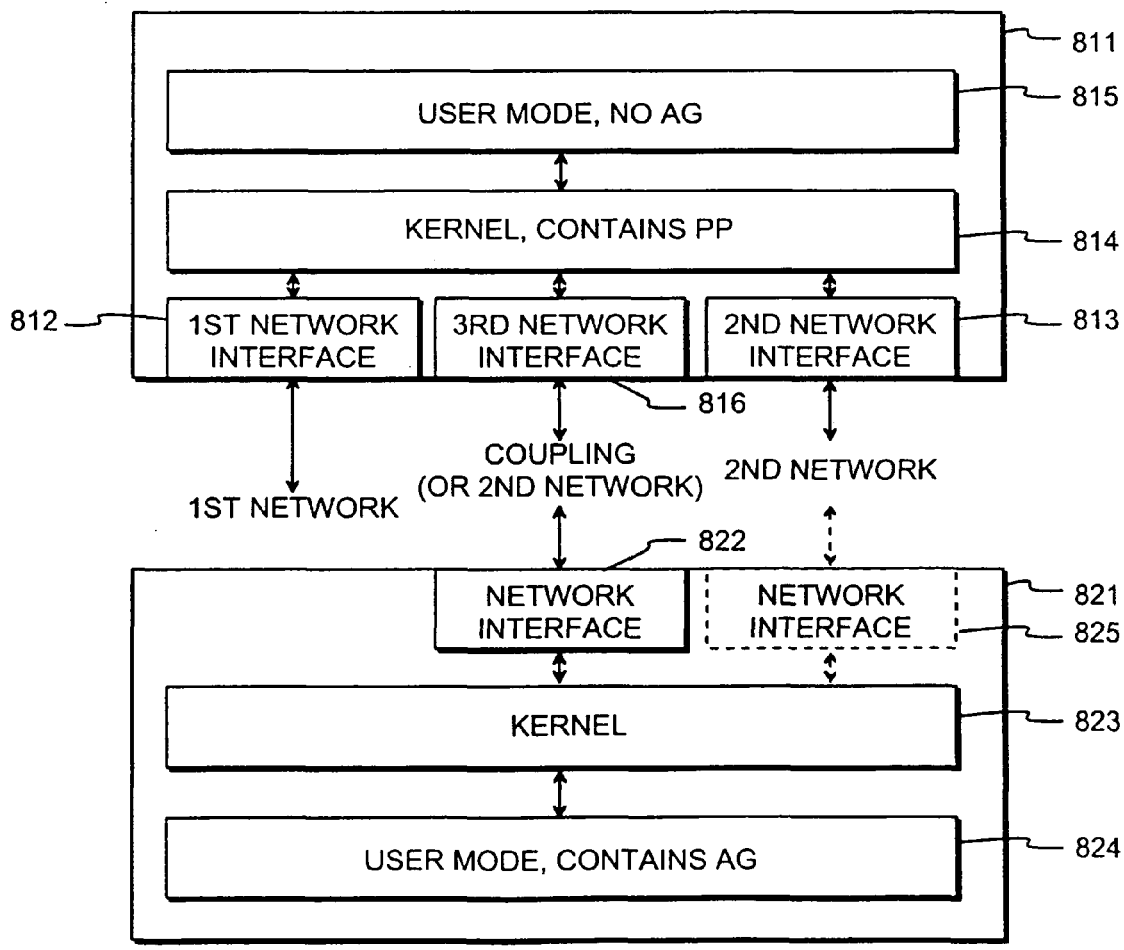

FIG. 8b illustrates schematically a firewall device 811 that has a first network interface 812 for communicating with a first network and a second network interface 813 for communicating with a second network. The first and second networks correspond to the previously mentioned external and internal networks respectively. The operating system kernel 814 is illustrated as communicating bidirectionally, i.e. transmitting and receiving packets, with both the first 812 and second 813 network interfaces. Also in FIG. 8b the kernel 814 contains (preferably stateful) packet processor functionality that is arranged to execute the methods illustrated in FIGS. 6a or 6b and 6c. Also in FIG. 8b there is illustrated an exemplary user mode entity 815 that has a bidirectional communication connection with the kernel 814, but this user mode entity is there just for running various control applications of the packet processor functionality and has no significance to the scope of the present invention.

On the other hand there is another computer device 821 that has a communications connection with the firewall device 811 so that a third network interface 816 at the firewall device 811 is arranged to communicate with a network interface 822 at the other computer device 821. The other computer device 821 comprises typically also an operating system kernel 823, but it has minor importance to the present invention. Much more importantly in a bidirectional communications connection with the kernel 823 there is a user mode entity 824 that contains application gateway functionality that is arranged to execute the method illustrated in FIG. 7a, or the modified method illustrated by replacing the appropriate steps of FIG. 7a with those of FIG. 7b. In order to potentially bypass the firewall device 811 in exchanging packets with the second network the other computer device may contain another network interface 825 that offers it a bidirectional communications connection to the second network; the optionality of such an arrangement is illustrated in FIG. 8b through using dashed lines. The communications connection between the firewall device 811 and the other computer device 821 can also go through the second network, in which case blocks 813 and 825 are unnecessary and the coupling between blocks 816 and 822 is through the second network.

The kernel 823 or a suitable user mode process at its command can be used to implement the deNATting/reNATting layer that was discussed previously.

The invention claimed is:

1. An electronic device for handling packets being exchanged between an untrusted network and a protected network, the electronic device comprising:
a plurality of gateway devices for processing packets associated with respective ones of a plurality of different communication protocols, each gateway device operating based upon a user mode; and
a packet processor device operating based upon a kernel mode and for
intercepting a packet from the untrusted network and intended for delivery to the protected network, the packet comprising original values for source and destination information fields, the original value for the source information field comprising a source address, the original value for the destination information field comprising a destination address,
replacing the original values for the source and destination information fields with replacement values, different from the original values, for the source and destination information fields,
determining whether the packet is associated with at least one of the plurality of different communication protocols and if so, routing the packet to the respective gateway device based upon packet source information and an associated communication protocol of the packet so that the respective gateway device authenticates the routed packet based upon the at least one communication protocol, and otherwise processing the packet for delivery to the protected network, receiving from said plurality of gateway devices authenticated packets and processing the authenticated packets for delivery to the protected network, and restoring processed packets from said plurality of gateway devices to include the original values for the source and destination information fields.

2. The electronic device according to claim 1 wherein said packet processor routes the packet by at least replacing the original value of the destination information field within the packet with a replacement value identifying the respective gateway device as the destination of the packet, and communicates to the respective gateway device the original value of the destination information field; and wherein the respective gateway device uses the original value of the destination information field in processing the packet.

3. The electronic device according to claim 2 wherein said packet processor replaces the original value of the source information field in the packet with a replacement value identifying said packet processor as a source of the packet, and communicates to the respective gateway device the original value of the source information field; and wherein the respective gateway device uses the original value of the source information field for processing the packet.

4. The electronic device according to claim 2 wherein said packet processor transmits the original value together with the routed packet.

5. The electronic device according to claim 4 wherein said packet processor sets a value of a certain bit in the packet to indicate the presence of urgent information within the packet, inserts into a pointer field in the packet a pointer value that points at the end of urgent information within the packet, and inserts the original value as urgent information into the packet before the location pointed at by the pointer value; and wherein the respective gateway device reads the original value from the location in the packet pointed at by the pointer value.

6. The electronic device according to claim 4 wherein said packet processor sets a value of an options field in the packet to indicate the presence of optional information within the packet, and inserts the original value into the packet as optional information; and wherein the respective gateway device reads the original value from the packet as optional information.

7. The electronic device according to claim 2 wherein the communicating of the original value comprises transmitting the original value from the packet processor to the respective gateway device separately from the routed packet.

8. The electronic device according to claim 7 wherein said packet processor composes a messaging packet that conforms to a messaging protocol, inserts the original value into the messaging packet together with the replacement value, and transmits the messaging packet to the respective gateway device; and wherein the respective gateway device receives the messaging packet, and associates the original value read from the messaging packet with the replacement value found in the routed packet.

9. The electronic device according to claim 8 wherein the messaging packet comprises a User Datagram Protocol (UDP) packet.

10. The electronic device according to claim 8 wherein said packet processor transmits the messaging packet to the respective gateway device a plurality of times to transmit redundant copies of the messaging packet.

11. The electronic device according to claim 7 wherein the respective gateway device transmits to said packet processor a query for original values of desired fields; and wherein said packet processor only transmits the original values of the desired fields to the respective gateway device as a response to the query.

12. The electronic device according to claim 7 wherein said packet processor transmits the original value to the respective gateway device, and if the respective gateway device has not received the transmitted original value within a certain time limit after the reception of a packet for which the original value is associated, the respective gateway device transmits to said packet processor a query for the original value so that said packet processor also transmits the original value to the respective gateway device as a response to the query.

13. The electronic device according to claim 1 wherein said packet processor routes the packet by at least:

prepending a header to the packet comprising a value identifying the respective gateway device as the destination of the packet;

stripping the prepended header from the packet at the respective gateway device; and using the original value of a destination information field in the packet at the respective gateway device in processing the packet.

14. The electronic device according to claim 13 wherein the prepended header also includes a value that identifies the packet processor as the source of the packet.

15. The electronic device according to claim 1 wherein said packet processor envelopes a packet to be rerouted to the respective gateway device into an enveloping packet; and wherein the respective gateway device extracts the original packet from the enveloping packet.

16. The electronic device according to claim 15 wherein the enveloping packet is based upon the Socks protocol.

17. A method for handling packets exchanged between an untrusted network and a protected network in a device comprising a plurality of gateways and a packet processor communicating therewith, the method comprising:

using the plurality of gateway devices for processing packets associated with respective ones of a plurality of different communication protocols, each gateway device operating based upon a user mode; and operating the packet processor device based upon a kernel mode and for intercepting a packet from the untrusted network and intended for delivery to the protected network, the packet comprising original values for source and destination information fields, the original value for the source information field comprising a source address, the original value for the destination information field comprising a destination address, replacing the original values for the source and destination information fields with replacement values, different from the original values, for the source and destination information fields, determining whether the packet is associated with at least one of the plurality of different communication protocols and if so, routing the packet to the respective gateway device based upon packet source information and an associated communication protocol of the packet so that the respective gateway device authenticates the routed packet based upon the at least one communication protocol, and otherwise processing the packet for delivery to the protected network, receiving from the plurality of gateway devices authenticated packets and processing the authenticated packets for delivery to the protected network, and restoring processed packets from the plurality of gateway devices to include the original values of the source and destination information fields.

18. The method according to claim 17 further comprising:
routing the packet by at least replacing the original value of the destination information field within the packet with a replacement value identifying the respective gateway device as the destination of the packet, and communicating to the respective gateway device the original value of the destination information field; and
using the respective gateway device to use the original value of the destination information field in processing the packet.

19. The method according to claim 18 further comprising:
using the packet processor device to replace the original value of the source information field in the packet with a replacement value identifying the packet processor device as a source of the packet, and communicate to the respective gateway device the original value of the source information field; and
using the respective gateway device to use the original value of the source information field for processing the packet.

20. The method according to claim 18 wherein the communicating of the original value of the destination information field comprises transmitting the original value together with the routed packet.

21. The method according to claim 20 further comprising:
using the packet processor device to set a value of a certain bit in the packet to indicate the presence of urgent information within the packet, insert into a pointer field in the packet a pointer value that points at the end of urgent information within the packet, and insert the original value as urgent information into the packet before the location pointed at by the pointer value; and
using the respective gateway device to read the original value from the location in the packet pointed at by the pointer value.

22. An electronic device for handling packets being exchanged between an untrusted network and a protected network, the electronic device comprising:
first and second network interfaces respectively communicating with the untrusted and protected networks;
a plurality of gateway devices for processing packets associated with respective ones of a plurality of different communication protocols and received via the first network interface, each gateway device operating based upon a user mode; and
a packet processor device operating based upon a kernel mode and for
intercepting a packet from the untrusted network via the first network interface and intended for delivery to the protected network, the packet comprising original values for source and destination information fields, the original value for the source information field comprising a source address, the original value for the destination information field comprising a destination address,
replacing the original values for the source and destination information fields with replacement values, different from the original values, for the source and destination information fields,
determining whether the packet is associated with at least one of the plurality of different communication protocols and if so, internally routing the packet to the respective gateway device based upon packet source information and an associated communication protocol of the packet so that the respective gateway device authenticates the routed packet based upon the at least one communication protocol, and otherwise processing the packet for delivery to the protected network,
receiving internally from said plurality of gateway devices authenticated packets and processing the authenticated packets for delivery to the protected network via the second network interface, and
restoring processed packets from said plurality of gateway devices to include the original values for the source and destination information fields;
said first and second network interfaces, said plurality of gateway devices, and said packet processor device being integrated on a same device.

* * * * *